United States Patent

[11] 3,573,622

[72] Inventors Louis N. Holzman
Lincroft;
John R. Sheehan, Red Bank, N.J.
[21] Appl. No. 723,456
[22] Filed Apr. 23, 1968
[45] Patented Apr. 6, 1971
[73] Assignee Bell Telephone Laboratories, Incorporated
Murray Hill, Berkeley Heights, N.J.

[54] PARTIAL-RESPONSE SIGNAL SAMPLING FOR HALF-SPEED DATA TRANSMISSION
5 Claims, 6 Drawing Figs.

[52] U.S. Cl. ........ 325/38, 325/42, 325/141, 325/321, 178/68
[51] Int. Cl. ........ H04b 1/66
[50] Field of Search ........ 325/38, 38 (A), 42, 141, 321, 322; 178/68

[56] References Cited
UNITED STATES PATENTS

| | | | |
|---|---|---|---|
| 3,388,330 | 6/1968 | Kretzmer | 325/42 |
| 3,492,578 | 1/1970 | Gerrish | 325/42 |

*Primary Examiner*—Richard Murray
*Assistant Examiner*—Kenneth W. Weinstein
*Attorneys*—R. J. Guenther and Kenneth B. Hamlin

ABSTRACT: Theoretically maximum equivalent binary data transmission rates are obtainable in partial-response channels; i.e., bandlimited channels with filter shaping which disperses the impulse response to individual data inputs over more than one signaling interval. However, the resultant multilevel line signals occasionally give rise to system start-up problems. These problems are eliminated by initial sampling of alternate data input pairs for one particular partial-response format to produce a two-level line signal which preserves transitions occurring at the basic signaling interval. The same technique provides means for signaling at half the design rate without changing channel filters or the basic clock rate.

INVENTORS L.N. HOLZMAN
J. R. SHEEHAN
BY J.P. Kearns
ATTORNEY

PARTIAL-RESPONSE SIGNAL SAMPLING FOR HALF-SPEED DATA TRANSMISSION

BACKGROUND OF THE INVENTION

1. Field of the Invention

This invention relates generally to high-speed transmission of digital data over transmission channels of limited bandwidth and particularly to the control of the signaling characteristics of such channels with respect to the number of line signal levels generated.

2. Description of the Prior Art

In the copending U.S. Pat. application of E. R. Kretzmer, Ser. No. 441,197 filed March 19, 1965 and entitled "Partial Response Data System" the concept of signal channel shaping to produce controlled correlation between received signal samples is introduced. Such signal shaping can produce desirable effects such as efficient use of available bandwidth and elimination of direct-current components. As a consequence, however, the response to binary data signals is forced to extend over more than one signal interval. Each received signal sample then includes superposed contributions in a known structural pattern from more than one input signal at a time and occupies one of more than two discrete levels.

In accordance with the partial-response concept, the impulse (time domain) response of a channel is spectrally shaped so that each binary input signal evokes a response extending over more than one signaling interval, i.e., the channel response to a given input is only partial within a single signaling interval. The received signals then occupy a number of discrete levels determined by the number of signaling intervals over which the channel impulse response extends and also by the character of the weighting imparted to each of the multiple responses. One particular partial-response format, designated Class IV by Kretzmer, has been found to have particular practical advantages. In the Class IV format each binary input signal evokes two equally weighted nonzero responses of opposite polarity spaced by two signaling intervals. Thus, the composite received signal resulting from a serial data train includes at each sampling instant contributions from the present transmitted signal and the signal transmitted two signaling intervals previously and can occupy one of three discrete levels. The channel shaping required to produce the Class IV partial-response format is a symmetrical dome-shaped amplitude-frequency characteristic with zero response at upper and lower band edges and maximum response at mid-frequency. Subject to a small noise penalty over conventional binary signaling, spectral shaping under the partial-response concept permits effective signaling at the maximum theoretical rate of two bits per cycle of bandwidth without sharp cutoffs in frequency response at the edges of a bandlimited transmission channel.

The noise penalty inherent in partial-response signaling is of manageable proportions when the transmission channel is properly equalized. However, the channel may be initially unequalized. The more highly distorting the channel is, the longer will be the settling period for acceptable equalization. Also, during the initial connection period the receiver must be brought into synchronism with the receiver. The synchronization period will also be extended unduly if the channel is highly distorting. If, on the other hand, a starting sequence can be provided which, while preserving an adequate number of transitions at the intended high-speed signaling rate, generates only the outer signaling levels, the effective signal-to-noise ratio will be substantially doubled during start-up for a normal three-level line signal. A reduced settling time for synchronization and equalization thus ensues.

It is an object of this invention to modify the signaling characteristics of a normal multilevel partial-response line signal to provide a two-level line signal for facilitating initialization procedures.

It is another object of this invention to use digital means to modify a multilevel partial-response line signal to produce a two-level line signal for initialization or signaling purposes.

It is a further object of this invention to provide for multispeed transmission rates in a partial-response signaling system without altering the basic sampling rate or channel filter characteristics.

SUMMARY OF THE INVENTION

According to this invention, the normal multilevel, partial-response digital-data signaling system is modified to eliminate intermediate levels from the resultant line signal to increase the noise margin and reduce the sensitivity to channel distortion for special purposes preparatory to message signal transmission and also to effect half-speed signaling rates. Intermediate signaling levels in the channel signal are eliminated by the expedient of selective sampling of the serial data train to be transmitted only at instants which assure that no nonzero component in the complete response to a prior data sample is then being generated.

In the Class IV partial-response format presented herein as a particularly advantageous illustrative embodiment, selective sampling is effected by sampling at alternate pairs of sampling instants. No sampling is done at the other two sampling instants between alternate pairs. Thus, there is no superposition of tails of the impulse response of prior samples and only the outer levels are transmitted. At the same time the amplitude of the selected samples is standardized to generate only the normal outer response levels.

A binary "eye pattern" is observed at the receiver instead of a three-level eye and an effective doubling of the signal-to-noise ratio is thereby attained. Since transitions can occur in the resulting line signal at the basic sampling interval, no changes are required at the receiver to use this line signal for timing recovery and automatic equalizer control.

The same sampling technique can be used to transmit a serial binary signaling train at half the sampling rate over the same partial-response channel. The same sampling technique is employed at the transmitter as for start-up control and a two-level line signal results. However, modifications are required at the receiver in order to insure sampling only at the correct times. In the case of the Class IV format of the illustrative embodiment there exists an axial symmetry in each group of four successive sampling instants. The average value of each correct group of four instants is zero. Therefore, a modulo-two sum of each group of four can be monitored and the phase of the sampling train can be slipped in phase until the correct zero average value is obtained. Then the alternately paired samples will yield the correct half-speed signal train. The modulo-two sum can also be used as an error indication when it is nonzero in value over the range of four counts.

It is a feature of this invention that a partial-response data transmission system can be modified by digital means to yield a two-level signal for initialization purposes.

It is another feature of this invention that a partial-response data transmission system can be transformed into a multiple speed system by use of a digital applique circuit.

DESCRIPTION OF THE DRAWING

The above and other objects, features and advantages of this invention will be more fully appreciated from a consideration of the following detailed description and the drawing in which.

DETAILED DESCRIPTION

A partial-response data transmission system as described in the Kretzmer patent application cited above transmits a two-level (binary) data signal over a transmission channel with memory extending over $n$ binary input symbol intervals and retrieves the transmitted binary on the basis of $l$ significant detected levels. The number of levels $l$ equals or exceeds the number $n$ of symbol intervals in all cases. Conventional binary transmission is conducted over memoryless channels in which the complete response to each input symbol is confined to one signaling interval.

H. Nyquist has shown in his classical paper, "Certain Topics in Telegraph Transmission Theory," (Transactions of the American Institute of Electrical Engineers, Volume 47, Page 617, Apr. 1928) how to convey 2$W$ symbols per second through a bandlimited channel of width $W$ cycles per second. In the frequency domain a rectangular received spectrum with sharp upper and lower band edges is required. In the time domain an impulse response of the form $(\sin\pi Wt)/\pi Wt$ results. A rectangular spectrum can at best be only approximated in practice and even then extremely precise sampling is required. Conventional transmission systems generally rely on more reasonable channel characteristics with smooth rolloffs in frequency at the upper band edge. The transmission rates then attainable are only W symbols per second, or half the theoretical maximum rate.

Kretzmer has shown that transmission rates of 2$W$ symbols per second can be obtained in channels with smooth rolloffs and bandwidths of $W$ cycles per second by linearly superposing two or more identical $(\sin \pi Wt)/\pi a Wt$ spread-out impulse responses to form multilevel line signals. Precoding techniques can be used to impart unambiguous binary significance to the several detected levels. Five classes of superpositions have been described by Kretzmer. Two of these classes are of band-pass, rather than low-pass, nature and provide smooth rolloffs in frequency at both upper and lower band edges. The smooth rolloff at the lower band edge eliminates direct-current transmission. The superposition designated Class IV is of particular interest with respect to the present invention.

Figure 1:
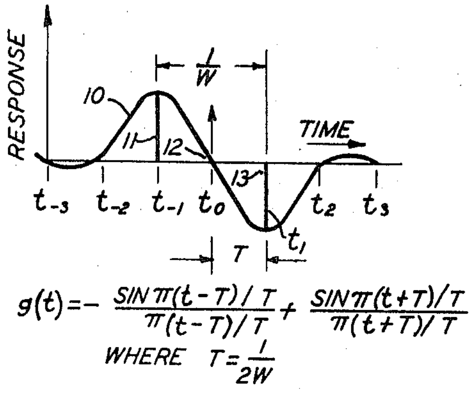
FIGS. 1 and 2 are respectively the time and frequency domain characteristics of a partial-response transmission channel spectrally-shaped for the Class IV format.

FIG. 1 shows the Class IV impulse response. The envelope 10 results from the superposition of two $(\sin \pi Wt)/\pi a Wt$ single impulse responses of opposite polarity spaced from each other by $1/W$ second. Sampling instants $t_n$ and $t_{n+1}$ are spaced from each other by $1/2W$ second. All samples taken at these times are of zero amplitude except at instants $t_{11}$ and $t_1$, at which times equal and opposite nonzero components 11 and 13 are realized. The average value is seen to be zero. A negative sample applied to a channel having the Class IV response will be the mirror image of envelope 10.

Figure 2:
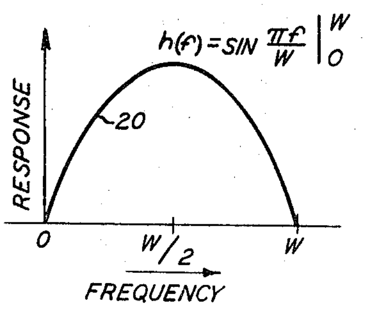

FIG. 2 shows the spectral shaping 20 of a transmission channel having the impulse response of FIG. 1. The bandwidth of the channel is $W$ cycles per second and the frequency response about the center frequency $W/2$ is symmetrical.

Figure 3:
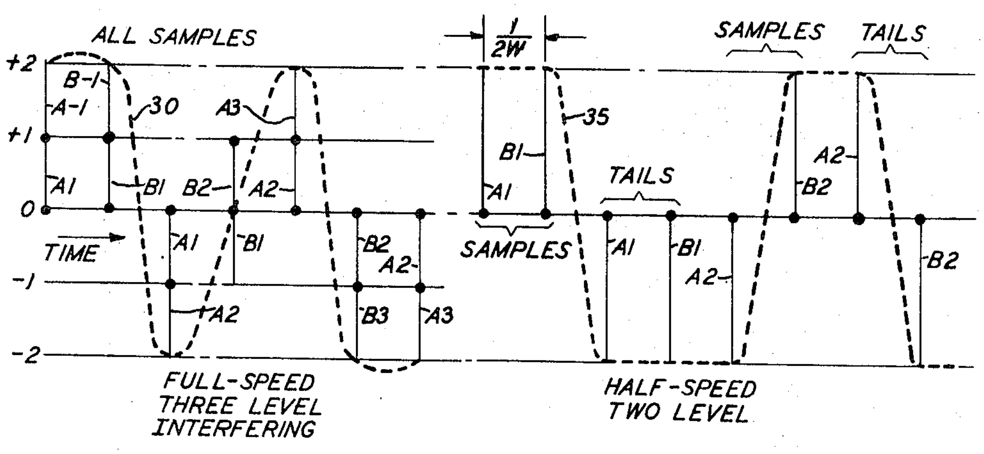
FIG. 3 is a waveform diagram showing the development of the normal three-level and the special-purpose two-level line signals, respectively, in the Class IV partial-response format.

FIG. 3 shows the development of a line signal with envelope 30 obtained by applying a serial binary data train to a transmission channel having the spectral shape of FIG. 2 and a transmission rate of $2W$ symbols per second. A binary signaling train with alternate unity amplitude samples $A_n$, $B_n$ is assumed to be the sequence 110110. One's are positive and zero's are negative. A train of zero's precedes this sequence. Sample A1 results in a positive nonzero component at the left and a negative nonzero component two sampling instants to the right. Sample A1 has superimposed on it a tail A–1 from a previous assumed zero sample, so that the complete response sample at the left-hand edge has an amplitude of 2 units. Similarly, the positive B1 sample in the next time instant has superimposed on it a tail from a previous O data sample. At the third sampling instant appears the tail A–1 of negative polarity. The negative sample A2 is superimposed on tail A–1 to yield a complete response of 2 units negative amplitude. At the fourth sampling instant a negative sample B1 has superimposed on it a positive tail B–2 for a net transmitted value of zero amplitude. The development of further samples A2 and B3 is now apparent. The resultant transmitted signal is indicated by the broken line curve 30. Transmitted levels at sampling instants separated by $1/2W$ second can only be +2, O or –2 units. Each level results from the superposition of the present sample and the tail of the sample transmitted two sampling instants previously. The received signal generates a three-level "eye" pattern, which results from the observation on an oscilloscope of the superposition of successive received signals synchronized at a multiple of the sampling rate. Slicing levels are established at the center of each eye, corresponding to levels +1 and –1 in FIG. 3. It is apparent that the margin against noise is at most half the difference between slicing levels or 1 unit.

The right half of FIG. 3 shows the line signal obtained from the same data sequence 110110 transmitted at half-speed at levels +2 and –2 units of amplitude only. Transmitted samples are taken at the rate $2W$ per second, but no samples are taken during the time of occurrence of the tails of previously transmitted samples. At the same time double-amplitude samples are applied to the partial-response filter. Positive samples A1 and B1 have corresponding negative tails two sampling instants later. Envelope 35 results. No zero-amplitude levels occur in the transmitted signal at sampling instants. A two-level eye pattern results which requires only one slicing level. The margin against a noise level of 1 unit amplitude is thereby doubled to 2 units.

Figure 4:
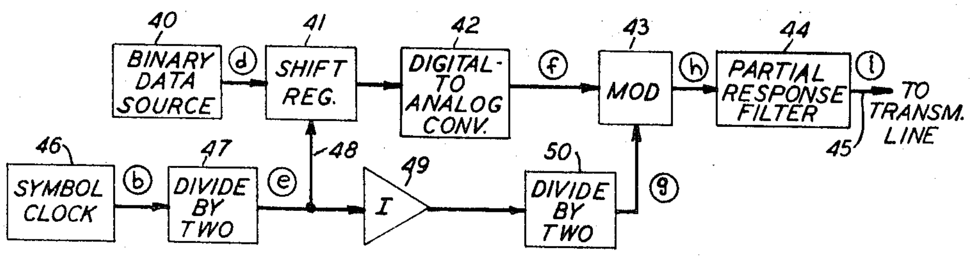
FIG. 4 is a block schematic diagram of a Class IV partial-response data transmitter modified according to this invention to generate a two-level line signal.

FIG. 4 is a block schematic diagram of a Class IV partial-response data transmitter modified according to this invention to generate a two-level line signal. The transmitter comprises binary data source 40, a shift register 41, a digital-to-analog converter 42, a gated (switching-type) modulator 43, a partial-response shaping filter 44, a symbol clock 46, frequency dividers 47 and 50, phase inverter 49, and a transmission channel 45. Binary data source 40 may be either a message data source, if message transmission at reduced speed is desired, or a random-word generator, if the transmitter is to be used solely to generate a starting sequence for a system later to be employed for message transmission. Symbol clock 46 generates a timing wave at the $2W$ per second symbol rate related to the bandwidth $W$ of the transmission line 45. Frequency dividers 47 and 50 successively divide the output of symbol clock 46 by factors of two. Inverter 49 changes the phase of the output of divider 47 by 180 electrical degrees. Shift register 41 stores samples taken from the output of data source 40. Converter 42 standardizes the output of shift register 41 at amplitude levels of plus and minus two amplitude units. Modulator 43 under the control of divider 50 gates alternate pairs of standardized data samples from converter 42 to partial-response filter 44. Filter 44 is designed according to known techniques to impart to transmission channel 45 the frequency response characteristic shown in FIG. 2. The encircled letters on FIG. 4 are keyed to the waveform diagram of FIG. 6.

Before describing the operation of the transmitter of FIG. 4 the generation of the normal Class IV partial-response signal will be described briefly in connection with lines $a$, $b$ and $c$ of FIG. 6. The normal partial-response transmitter comprises the arrangement of FIG. 4 with dividers 47 and 50, inverter 49 and modulator 43 omitted. Converter 42 would be replaced by a precoder. Since precoding is unnecessary when only two levels are being generated, precoding will not be discussed further herein. Data from source 40 is sampled at clock rate $2W$ and stored in shift register 41.

Figure 6:
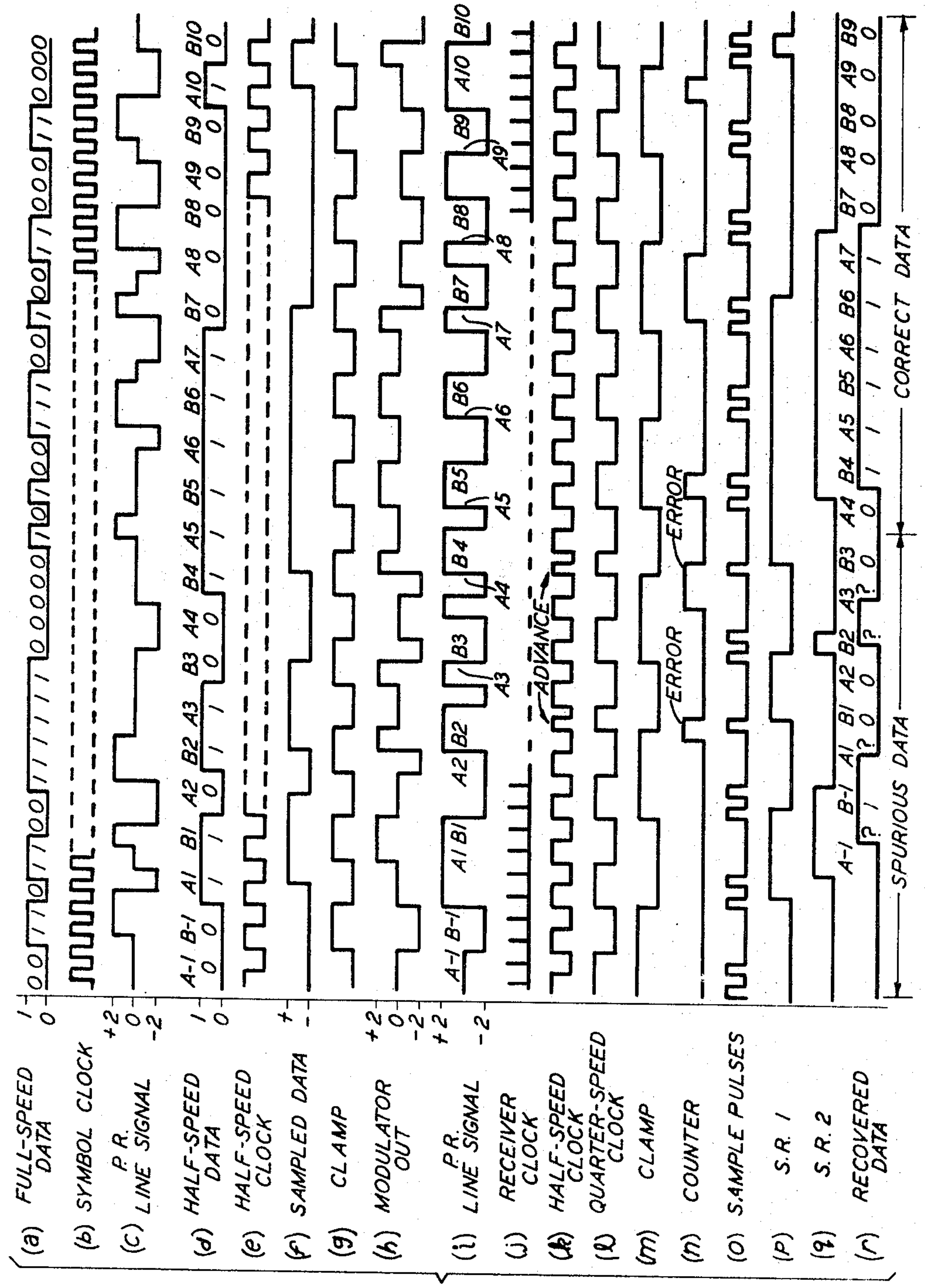
FIG. 6 is a waveform diagram illustrating the operation of the partial-response data transmitter and receiver of FIGS. 4 and 5.

Line $a$ of FIG. 6 shows a representative binary signal train with full-speed symbol rate $2W$. Line $b$ shows the $2W$ symbol clock train which controls the sampling of the data train to be transmitted. Each sample taken at the center of a data bit is applied to the Class IV partial-response filter to obtain the three-level line signal shown on line $c$ of FIG. 6. Since precoding is not a consideration in the present invention, the line signal shown on line $c$ is not precoded. Each level is simply the difference between the present sample and that obtained two sampling periods previously. It is significant here only to realize that this line signal generates a three-level eye pattern with a small concomitant noise disadvantage, which is to be compared with the two-level line signal to be generated at the half-speed sampling rate.

Line $d$ of FIG. 6 shows the same data sequence as line $a$, but generated at half-speed. Alternate bits are designated A and B. This data train is sampled at the average rate $W$ per second. The half-speed clock is obtained by dividing the output of symbol clock 46 by two in divider 47. The half-speed clock signal is shown on line $e$ of FIG. 6. The sampled data as it appears in shift register 41 is shown on line $f$. Digital-to-analog converter 42 serves only to standardize the amplitudes of the samples at plus and minus two units, and is conventional. The half-speed output of divider 47 is inverted in inverter 49 and further divided by two in divider 50 to obtain the clamping or gating wave shown on line $g$.

During the positive excursions of the clamping wave on line $g$ of FIG. 6 modulator 43 passes to its output a portion of the wave on line $f$ as it appears in the output of converter 42. During the negative excursions of the clamping wave on line $g$ the output of modulator 43, as shown on line $h$, is clamped at the zero level. The output of modulator 43 thus occupies three levels of which only the outer levels are significant and correspond to the binary data wave. For example, the first double-bit negative excursion corresponds to input data bits A–1 and B–1, which are negative. The next double-bit period is at zero level. The third double-bit period is positive and corresponds to data samples A1 and B1, which are positive. The remainder of the modulator output wave can be compared by inspection with the data wave.

When the wave of line $h$ of FIG. 6 is applied to partial-response filter 44, only the positive and negative excursions thereof will excite it. Thus, the negative responses A–1 and B–1 on line $i$ are followed by positive tails during the zero-level clamping period of the modulator output. Similarly, partial-responses A2, B2 are followed during the clamping period by tails of opposite polarity. The remainder of the partial-response wave of line $i$ is similarly related to the output of modulator 43 and to the data train as well. Effectively partial-response filter 44 is excited by alternate pairs of samples of the data wave on line $d$. Except for the initial two-bit interval the zero level does not appear in the partial-response line signal, yet transitions do occur at multiples of the symbol clock rate $2W$.

For start-up purposes the partial-response line signal of line $i$ of FIG. 6 may be entirely arbitrary as it generates a two-level eye pattern with doubled signal-to-noise advantage over the normal partial-response signal shown on line $c$ of FIG. 6. Therefore, it is readily appreciated that it will be of service in aligning an automatic equalizer at a receiver in a partial-response transmission system and in recovering initial timing information in such a system.

If, on the other hand, the signal wave of line $d$ is information-bearing, the transmitter of FIG. 4 provides means for transmitting it through partial-response filter 44. Thus, where the transmission channel is too distorting to permit the transmission of acceptable error-free information at the rate $2W$, the channel can still be used for half-speed transmission at the rate $W$. At rate $W$, however, samples are to be taken at the receiver in alternate pairs. This gives rise to the requirement of framing the pairs of samples in the proper phase. The receiver of FIG. 5 provides an arrangement for obtaining these samples at the proper instants.

Figure 5:
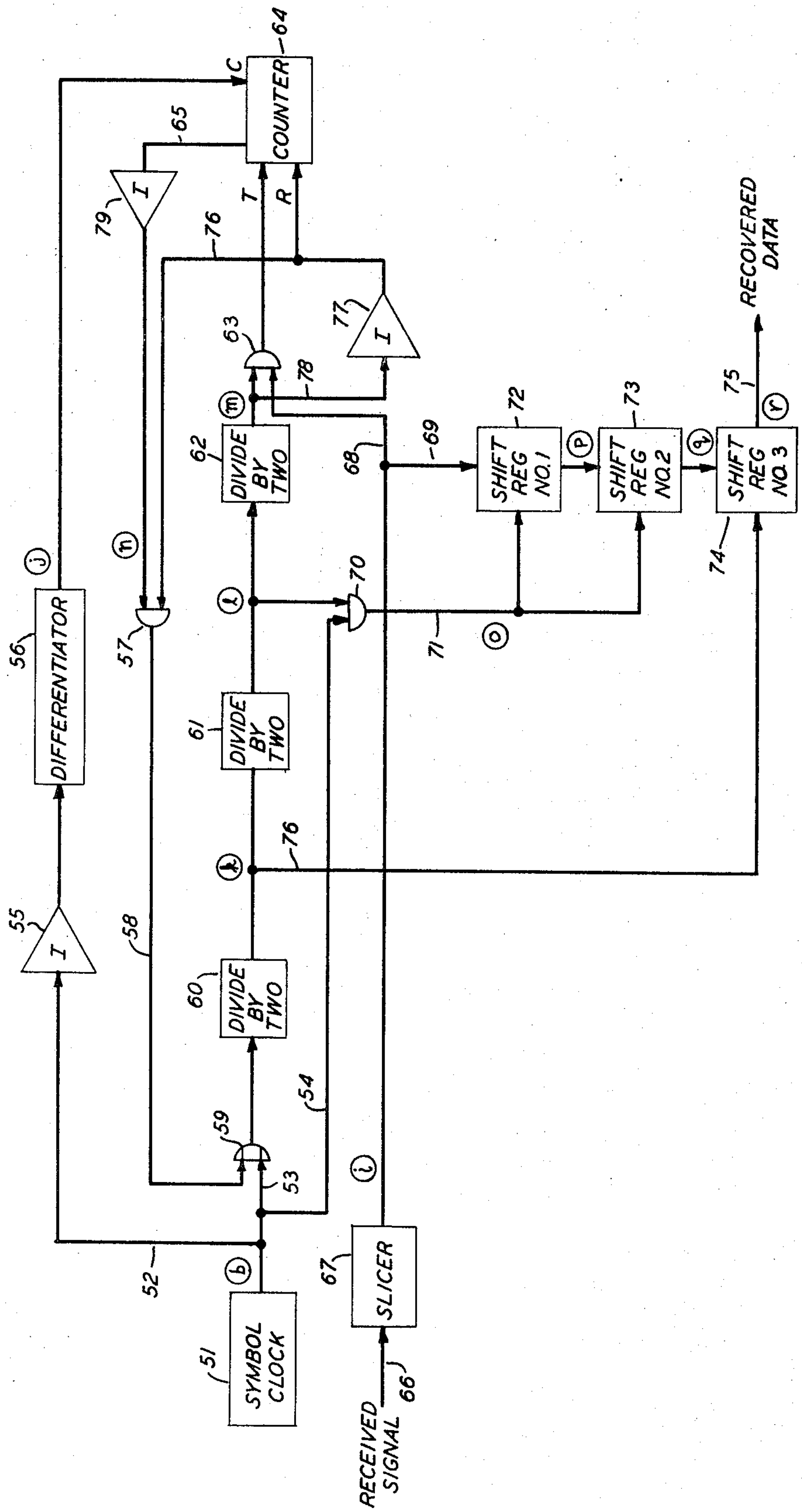
FIG. 5 is a block schematic diagram of a data receiver modified according to this invention to detect a two-level Class IV partial-response line signal and automatically establish the correct sampling sequence therefor.

FIG. 5 is a block diagram of a partial-response data receiver modified according to this invention to recover a half-speed data signal from a two-level line signal of the type generated by the transmitter of FIG. 4. The receiver of FIG. 5 comprises an input 66; a binary slicing circuit 67; a shift register having stages 72, 73 and 74; a symbol clock 51; AND gates 57, 63 and 70; OR gate 59; frequency dividers 60, 61 and 62; inverters 55, 77 and 79; differentiator 56 and counter 64. Encircled letters are keyed to the waveforms of FIG. 6.

The normal partial-response data receiver comprises a symbol clock, a multilevel slicer and detection logic. Since the partial-response signal generated according to this invention has only two levels, the multilevel slicer is replaced by a two-level slicer or is modified for two-level slicing. Symbol timing of clock 51 is assumed to be synchronized with transitions in the received signal by conventional means not shown here.

The operation of the partial-response data receiver according to this invention proceeds as follows. The received signal appears on input lead 66 and, after slicing in slicer 67, is available in squared-up form as shown on line $i$ of FIG. 6. The sliced signal is applied in common to shift-register stage 72 by way of lead 69 and to AND gate 63 by way of lead 68. The output of symbol clock 51 is at the same time applied by way of lead 52 to inverter 55 and to OR gate 59 by way of lead 53. The inverted output of inverter 55 is differentiated in differentiator 56 to obtain timing spikes at the symbol clock rate $2W$ as shown on line $j$ of FIG. 6. These spikes control the operation of a counter 64. Counter 64 is a conventional flip-flop with toggle input T, reset input R, timing input C, and a binary output indicated by lead 65.

Since the two-level line signal was generated by sampling in alternate pairs at the basic rate $2W$, the received signal must be similarly sampled. It will be noted that there exists an axial symmetry about each group of four symbols properly taken to include two data samples and two tails. The average value of each group of four is zero. When an arbitrary group of four has a nonzero average value, the indication is that the two samples are being taken at an incorrect quadrantal phase. The quadrantal groups starting with designated samples $A_nB_n$ are each followed by two tails and have the average value zero. However, a group beginning with B2 and ending with A3 is seen to have a positive average value and, if samples were taken in the alternate-pair relationship, spurious data would result. The purpose of the timing phase control circuits is therefore to monitor this symmetry relationship from group to group and adjust the phase of timing wave until the correct quadrantal phase is achieved.

Accordingly, the output of symbol clock 51 after passing through OR gate 59 is counted down in divider 60 to produce the half-speed clock wave shown on line $k$ of FIG. 6. This wave is further divided in dividers 61 and 62 to form respective quarter-speed and clamping waves shown on lines $l$ and $m$ of FIG. 6. It will be observed that AND gate 63 is clamped to ground during negative excursions of the wave $m$ so that no part of the sliced wave on lead 68 can then pass through gate 63. However, during positive half-cycles of the wave $m$, which exactly spans a group of four signal intervals in the received wave, the output of slicer 67 is admitted to the toggle T input of counter 64. If the received wave is positive at the time a symbol clock pulse from differentiator 56 occurs at count C input of counter 64, the latter changes state. Such a change of state occurs as shown on line $n$ of FIG. 6 after bits B2 and B9, as well as just prior to bits A4 and at bits A5 and A7 of the line signal wave. The clamping wave in the output of divider 62 is applied by way of lead 78 in inverter 77, whose output in turn is applied to the reset input of counter 64. Thus, counter 64 is reset coincident with the clock pulse at input C if not already reset. Where there is proper phasing, counter 64 will have been toggled to the reset state by the sampled data within the group-of-four clamping interval as can be seen at bit B5 and just before bits A8 and A10 of the received signal. The inverter clamping wave in the output of inverter 77 is also applied by way of lead 76 to AND gate 57, which is thereby enabled during the normal ground half-cycle thereof. When the counter is reset after the end of a positive cycle of the clamping wave, the resetting of counter 64 causes an impulse by way of lead 65 and inverter 79 to be applied to AND gate 57. The pulse in the output of gate 57 traverses lead 58 and OR gate 59 to add an extra impulse to divider 60 and thereby advances its output by one sampling interval. This is indicated on line *k* of FIG. 6 at two instants labeled "advance." The quarter-speed and clamping waves of lines *l* and *m* are correspondingly advanced in phase. This process is repeated until counter 64 is consistently reset during the enabling cycle of the clamping wave and no error output is obtained from the counter.

Alternate pairs of sampling pulses for advancing the data stored in the shift register stages 72 and 73 are derived by gating the symbol clock wave *b* on lead 54 with the quarter-speed clock wave *l* in the output of divider 61 in AND gate 70. Line *o* of FIG. 6 shows these paired sampling pulses. Initially it is seen that these pairs are not in phase with the information-bearing intervals of the received line signal, i.e., at A–1, B–1; A1, B1, and A2, B2. The pairs control the shift advance of register stages 72 and 73 by way of lead 71. The date samples stored in register stage 72 are shown on line *p* on FIG. 6. These samples are shifted in time with the sampling wave *o* successively to register stages 73 and 74, as shown on lines *p* and *q* of FIG. 6. Data is shifted out of register stage 74 by half-speed clock wave *k* appearing on lead 76 as shown on line *r* of FIG. 6. It will be noted on line *o* that only one sampling pulse is generated when an error pulse occurs. Because the first six sets of sampling pulses are in improper phase as is shown by the occurrence of two successive error pulses, the binary data delivered to output lead 75 from register 74 is spurious during the first half of the recovered data wave on line *r* and is so designated in FIG. 6. For example, transitions rather than positive or negative steady states occur at times when bits A–1, A1, B2 and A3 would be expected and bits B–1, B1, A2 and B3 are complements of the correct data. However, commencing with bit A4 and extending therefrom to the right in the recovered data train, the transmitted data train of line *d* is accurately reproduced. Proper phasing for the sampling wave has been attained, and will be maintained and corrected automatically thereafter, as necessary. The correctly recovered data is seen to be evenly spaced at intervals of $1/W$ second.

It will be understood that many specific techniques, other than those described above, can be used in the matter of sampling, gating, storing, shifting and logical manipulation. The particular techniques illustrated have been chosen from the point of view of ease and clarity of explanation without any intent to imply restriction of the invention principle to the employment of these techniques. Counter 64, for example, may be required to count over an extended period before shifting the clock phase to avoid spurious changes due to noise spikes.

The principles applied above to the Class IV partial-response signaling format are equally applicable to the other classes of superposition described by Kretzmer, at least insofar as multiple speed signaling is concerned, as will be apparent to those skilled in the art. Transitions at the 2W transmission rate can only be attained for those classes of superposition having intermediate zero components.

We claim:

1. The combination with a data transmission channel having a fixed bandwidth and spectral shaping such as to generate an impulse response which includes more than one nonzero component for each input data sample at multiples of the reciprocal of twice its bandwidth and normally converting data samples taken at twice its bandwidth into a multilevel channel signal and means generating a two-level channel signal for fractional speed transmission comprising:
   - a binary data source;
   - means sampling the output of said source at an average rate equal to said bandwidth; and
   - gating means admitting data samples from said sampling means to said channel at only one of the sampling intervals at which nonzero response components for each input to said channel occur.

2. The combination defined in claim 1 and a receiver at the far end of said transmission channel reconstructing the transmitted binary data train.

3. The combination defined in claim 1 *W* which:
   - the bandwidth of said transmission channel is W cycles per second and the spectral shaping is such as to produce an impulse response with two equal nonzero components of opposite polarity at a spacing of $1/W$ second and zero-level components at all other multiples of $1/2W$ second;
   - said sampling means generates sampling pulses at the rate $2W$ per second; and
   - said gating means admits alternate pairs of data samples from said sampling means to said transmission channel.

4. A data transmitter for generating a two-level line signal with zero-crossing transitions occurring at intervals of the reciprocal of twice the bandwidth of a bandlimited transmission channel having a spectral shaping such that the normal impulse response extends over more than one signaling interval and results in a three-level line signal comprising:
   - a binary data source;
   - a symbol clock source generating a clock signal wave at a rate equal to twice the bandwidth of said transmission channel;
   - means controlled by said clock source generating a sampling wave at a rate equal to the bandwidth of said channel and a gating wave at a rate equal to half the bandwidth of said channel and initially opposite in phase to said sampling wave;
   - modulator means controlled by said gating wave and having a signal input and a signal output, said signal output being clamped to a ground reference value during alternate half-cycles of said gating wave;
   - shift-register means transferring samples from said data source to the signal input of said modulator under the control of said sampling wave;
   - means standardizing the amplitude of data samples applied to said modulator from said register means; and
   - partial-response filter means driven by the signal output of said modulator means during unclamped half-cycles of said gating wave shaping the response of said transmission channel to generate for each data sample applied thereto two nonzero components of equal amplitude but opposite polarity spaced by the reciprocal of the bandwidth of said channel.

5. The data transmitter and transmission channel as defined in claim 4 in combination with a data receiver comprising:
   - a further symbol clock source generating a clock signal wave at a rate equal to twice the bandwidth of said transmission channel;
   - means controlled by said further clock source deriving a sampling wave at a rate equal to the bandwidth of said channel, a gating wave at a rate equal to half the bandwidth of said channel and a clamping wave at a rate equal to one-fourth the bandwidth of said channel;
   - a three-stage shift register;
   - means slicing the signal wave incoming over said channel;
   - means applying said sliced signal wave to the first stage of said shift register;
   - means applying said sampling wave to the terminal stage of said shift register to control the advance thereof;
   - means combining said gating wave and said clock signal wave to provide advance signals to the first and second stages of said shift register;
   - counter means timed by said clock signal shifted in phase by 180° and having toggle and reset inputs;
   - means combining said sliced signal wave and said clamping wave to provide a signal to the toggle input of said counter means during alternate groups of four clock signal intervals and to disable said counter means otherwise;
   - means inverting said clamping wave to reset said counter means at the termination of said alternate groups of four clock signals; and
   - means combining the outputs of said counter means and said clamping wave to shift the phase of said gating and clamping waves whenever said counter means has a count standing therein at the termination of said alternate groups of four clock signals.